Patented June 28, 1932

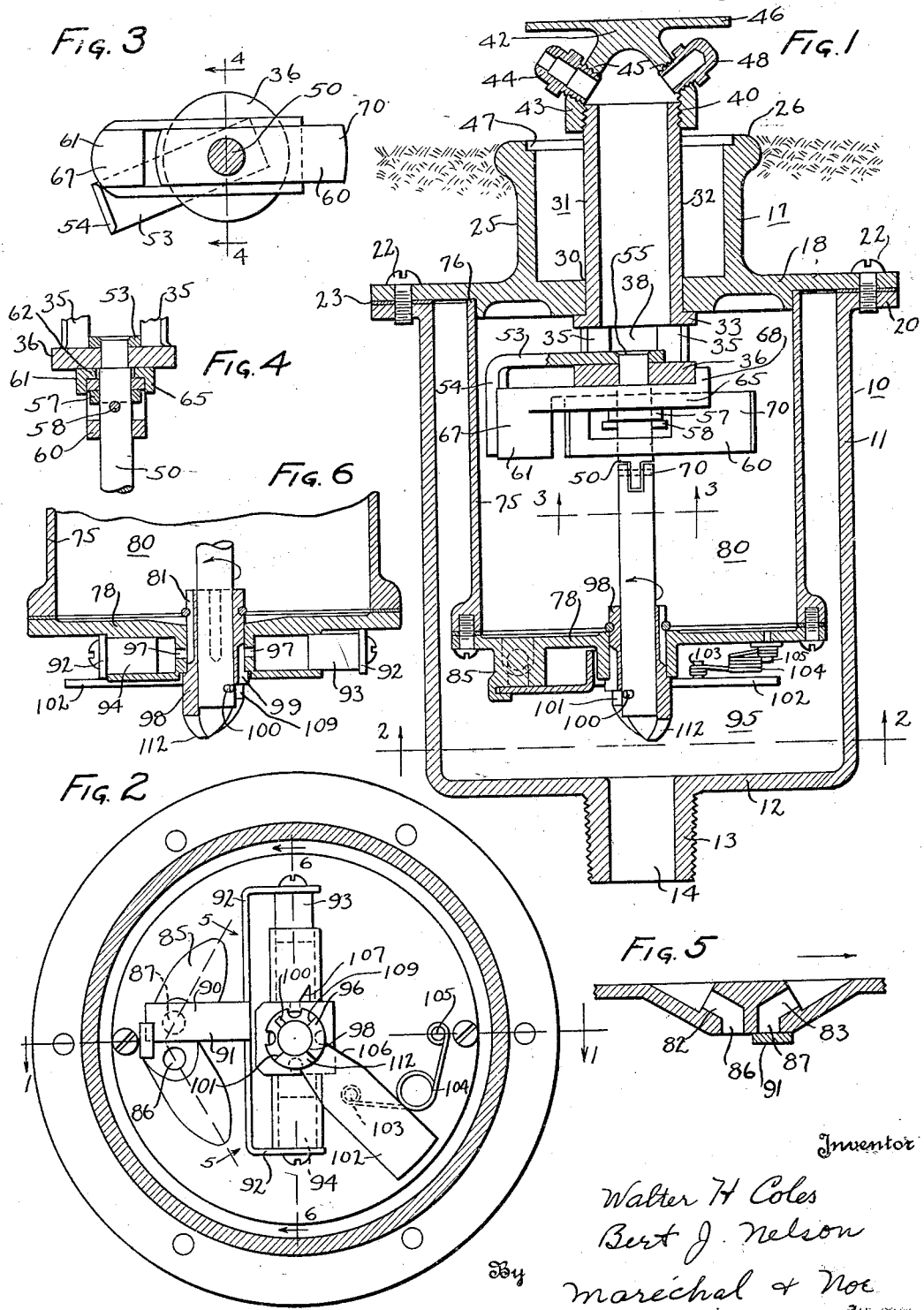
June 28, 1932.   W. H. COLES ET AL   1,864,892
SPRINKLER
Filed April 25, 1930   2 Sheets-Sheet 1
Inventor
Walter H Coles
Bert J Nelson
By Maréchal & Noe
Attorney

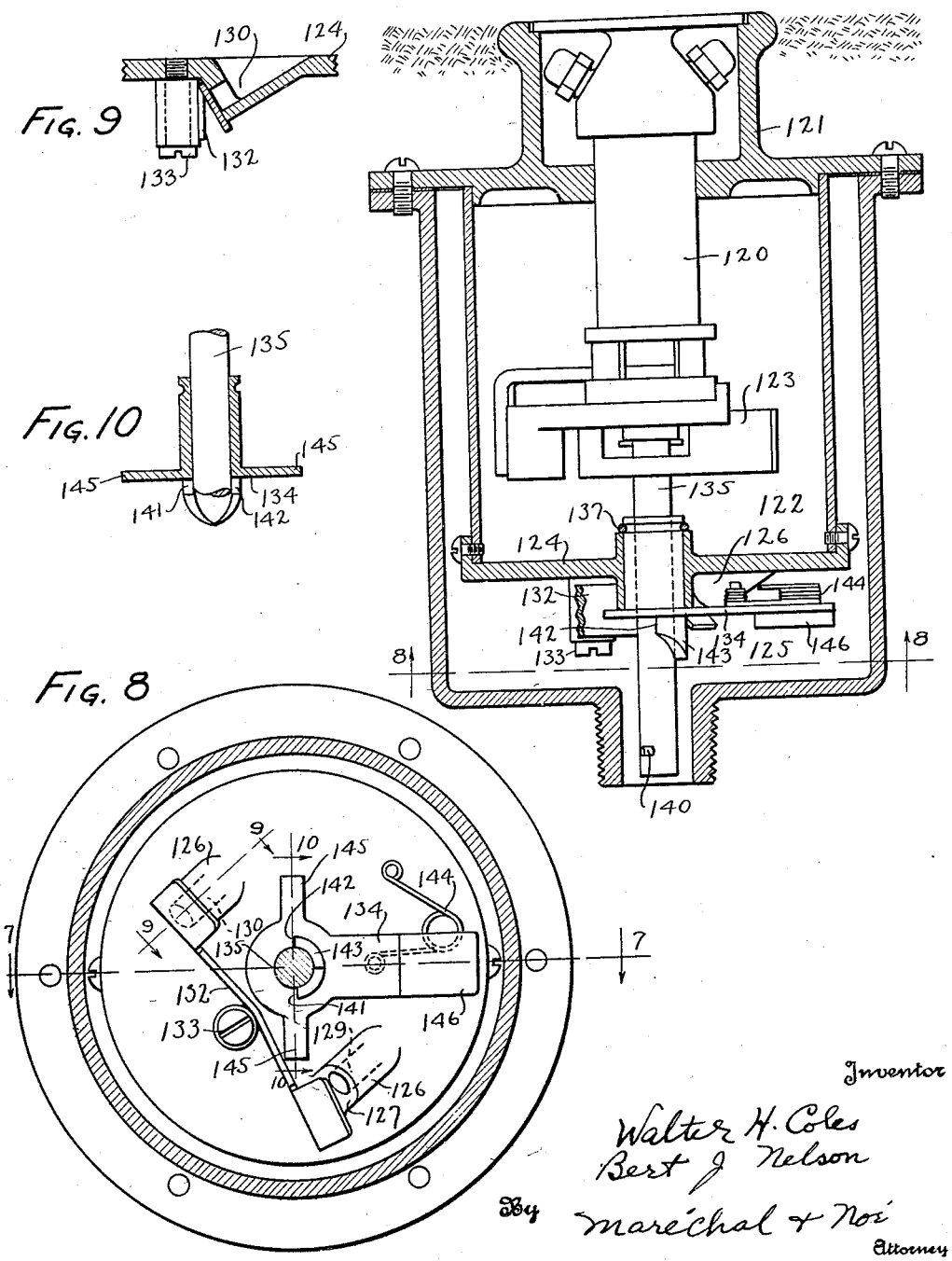

1,864,892

UNITED STATES PATENT OFFICE

WALTER H. COLES AND BERT J. NELSON, OF TROY, OHIO, ASSIGNORS TO THE SKINNER IRRIGATION COMPANY, OF TROY, OHIO, A CORPORATION OF OHIO

SPRINKLER

Application filed April 25, 1930. Serial No. 447,346.

This invention relates to sprinkling or irrigating apparatus, and particularly to sprinklers having a sprinkling member adapted to be moved within a definite path of travel during operation.

One object of the invention is the provision of a sprinkler of this character having a rotatable water operated driving member adapted to slowly rotate a sprinkling member which controls the direction of the rotation of the driving member automatically.

Another object of the invention is to provide a sprinkler having a rotatable sprinkling member with means for effecting rotary actuation of the sprinkling member, and with simple means entirely enclosed within the sprinkler to reverse the direction of travel of the sprinkling member.

Another object of the invention is the provision in such apparatus of a sprinkling member adapted to be rotated in reverse directions by a member operated by the passage of water through the sprinkler; the sprinkling member being automatically raised to an operative extended position by the pressure of the water supplied to the sprinkler and adapted, in extended position, to be oscillated within a definite range of travel.

A further object of the invention is the provision of a sprinkler of the character mentioned which is of simple, reliable and compact construction and devoid of gearing, and in which all of the control mechanism is completely enclosed within the sprinkler housing.

Other objects and advantages of the invention will be apparent from the following description, the accompanying drawings and the appended claims.

In the drawings, which disclose two preferred embodiments of the invention,

Fig. 1 is a transverse vertical section through a sprinkler constructed in accordance with this invention;

Fig. 2 is a sectional view taken on line 2—2 of Fig. 1;

Fig. 3 is a sectional view taken on line 3—3 of Fig. 1;

Fig. 4 is a detailed view in section taken on line 4—4 of Fig. 3;

Fig. 5 is a sectional view taken on line 5—5 of Fig. 2;

Fig. 6 is a sectional view taken on the line 6—6 of Fig. 2; some of the parts being removed for clearness of illustration;

Figs. 7 and 8 are views corresponding to Figs. 1 and 2 but showing a modified form of valve control;

Fig. 9 is a section on line 9—9 of Fig. 8; and

Fig. 10 is a section on line 10—10 of Fig. 8.

In the drawings, in which like characters of reference designate like parts throughout the several views thereof, a sprinkler is shown which is adapted to irrigate within a definite area, for example the corner of a lawn, which presents an area which the sprinkler may effectively cover by a rotational travel of less than 360 degrees. The sprinkler comprises a housing or support designated generally by the numeral 10 and comprising a cylindrical shell 11 having a bottom plate portion 12; these parts forming a cup like piece. An externally threaded boss 13 is provided on the plate portion 12, and a passage way 14 extends through the boss 13 to provide a path for the water; which may be supplied to the sprinkler as by means of a pipe threadedly engaging the boss 13. A housing cover member or top designated generally by the numeral 17 is provided and comprises a plate portion 18 which may be attached to an outwardly extending flange portion 20 formed integrally with the cylindrical portion 11 of the housing 10. Suitable means, such as the screws 22, are provided for joining the housing members 10 and 17; a suitable gasket 23 being provided between the flange 20 and the plate portion 18 to provide a water tight joint.

An upwardly extending sleeve portion 25 is provided on the plate portion 18; the top face 26 of this sleeve being adapted to be positioned substantially flush with the surface of the ground as shown in Fig. 1 and when so positioned the balance of the enclosing housing will be buried below ground level. A cylindrical opening 30 is provided in the plate 18 for the support of a sprinkling member designated generally by the numeral 31 and which comprises a tube or sleeve 32 movably positioned within the opening 30. The bottom end of the tube 32 is provided with an outwardly extending flange 33 which is adapted to engage the plate 18 and limit the upward movement of the sprinkling member 31 when it is moved into operating position. A plurality of webs 35 extend downwardly from the flange portion 33 and, at their lower ends, are joined to a plate 36; suitable openings 38 being provided between the webs 35 for the passage of water to the interior of the tube 32. The tube 32, webs 35 and plate 36 are preferably formed integrally of a single casting but may, if desired, be assembled from separate parts.

The upper end of the member 32 is threaded, as at 40, for reception of a cap member 42 which comprises a depending sleeve portion 43 which is adapted to threadedly engage the member 32. A sprinkler nozzle 44 is provided on the portion 43 and is held thereto as by means of threaded engagement within the opening 45. The cap 42 is provided with a flat disk-like top 46 which, when the sprinkler is in retracted or inoperative position, is adapted to be received within the recess 47 provided adjacent the top surface 26 of the sleeve 25. As shown the cap 42 is provided with a plurality of openings 45, one of which carries the nozzle 44 while the other opening 45 is provided with a blank plug 48. The area irrigated by the sprinkler is therefore limited to the angular travel of the single nozzle 44. Additional nozzles may, however, be substituted for the blank plugs if desired.

When water under pressure is supplied to the sprinkler housing 11 the sprinkler sleeve 32 will be caused to rise to operating position from its position as shown in Fig. 7, at which time the nozzle 44 will be lifted above the level of the top of the supporting housing so that the water may be distributed from the nozzle. When the supply of water to the sprinkler is cut off the sprinkling member 31 will fall of its own weight and the top 46 of the cap 42 will then be positioned flush with the top 26 of the supporting housing in which position none of the sprinkler will be above ground level and it will all be completely out of the way. When the sprinkler is in inoperative position a lawn mower may be moved directly over it without encountering any interference. The sprinkler in this position is inconspicuous and does not interfere with the smooth contour of the ground.

A vertical stem or shaft 50 is suitably secured to the plate 36 of the sprinkling member and projects downwardly therefrom. An actuating member such as a laterally extending arm 53 having a downwardly extending portion 54 is also provided on the plate 36 and, as shown, may be attached thereto with the shaft 50 as by means of riveting 55.

A driving device is provided in the housing and is adapted to be rotated by the passage of water through the housing to impart a rotative impulse to the sprinkling member 31. As shown this driving device comprises the parts 60 and 61 rotatably mounted on the shaft 50 and held thereon as by means of a collar 57 which is maintained in position on the shaft by the pin 58. The part 60 is a block upon which is slidably mounted the part 61. The slidable member 61 comprises a web portion 62 which lies between the top of the block 60 and the plate 36 and is provided with an elongated opening through which the shaft 50 extends. This opening provides for movement of the slidable member longitudinally with respect to the block 60; the web 62 being provided with down-turned flanges 65 which engage the sides of the block 60 and are adapted to maintain the slidable member 61 in position upon the block. The member 61 carries a weighted portion 67 at one end and is adapted to be moved outwardly in the direction of the weighted portion by the action of centrifugal force as the driving device is rotated. The opposite end of the member 61 is provided with an up-turned flange 68 which, upon outward movement, is adapted to engage the peripheral surface of the plate 36 to thereby limit the outward movement of the member 61. The block 60 is provided with a weighted portion 70 and in assembling the driving device the weighted portion 70 of the block 60 and the weighted portion 67 of the member 61 are positioned oppositely so that during rotation the device will tend to be balanced. The down-turned portion 54 of the actuating member is positioned in the path of the rotatable driving device so that as the device is rotated by water passing to the sprinkling member the weighted portion 67 of the slidably mounted member will strike the portion 54 to thereby impart a rotative movement to the sprinkling member 31. Being freely slidable on the block 60 the member 61, after striking the arm 54, will tend to rebound from contact with the arm 54 so that the driving device may continue in its rotation. After rebounding from the contacting arm 54 the weighted portion 67 will again be thrown by centrifugal force to its outward position and in line to again strike the arm 54 upon its next rotation. The extending end 70 of the block 60 is provided of such length to readily clear the arm 54 as it passes so that only the weighted end 67 will contact with it and, upon each rotation, will impart a slight rotative movement to it. The driving device is adapted to rotate at a substantial speed so that it will contact with the arm 54 at a frequency which causes an apparent constant movement of the sprinkling member 31 slowly in the direction of rotation of the driving device.

As mentioned above, means are provided for reversing the direction of travel of the sprinkler. The reversing mechanism comprises a valve structure which, as shown, is adapted to be actuated by rotational movement of the sprinkling member 31 and is adapted to reverse the flow of the water through the housing and consequently reverse the direction of travel of the driving device. The downwardly projecting shaft 50 of the sprinkling member is provided with a flexible coupling, such as the tongue and slot joint shown at 70, to provide a degree of freedom in aligning the sprinkling member and the valve structure. As shown, a depending cylindrical sleeve 75 is attached to the plate portion 18 at 76 and is preferably positioned concentrically with respect to the housing 11. An enclosing valve plate 78 provides a cover for the open end of the sleeve 75 and is suitably attached thereto; the connection being a water tight joint. The plate 78 with the sleeve 75 form a partition in the housing or support and provide with the top plate 18 a water receiving chamber 80. Suitable water passages are provided in the plate 78 so that water entering the housing 11 through the passage 14 may be admitted to the chamber or space 80 enclosed by the sleeve 75 and the plate 78 within which the driving device is located and from which water may flow through the openings 38 into the sprinkling member. The passages, two of which are shown and designated by the numerals 82 and 83, are preferably spaced apart and positioned at an angle to the plane of the plate 78 and are preferably positioned tangentially so as to impart a rotational whirl to the water in chamber 80. The passages 82 and 83 are oppositely arranged so that water admitted through one passage will have a rotational whirl imparted to it in reverse direction to the flow from the other passage.

A valve structure is provided so that the opening of the passages may be controlled to provide a flow of water in reverse directions past the driving device. As shown, the plate 78 is provided with an integrally formed boss 85 in which are provided adjacent entrance openings 86 and 87 for the corresponding passages 82 and 83. A valve member 90 is arranged so that it can slide over either opening to regulate the direction of rotation. This valve member 90 comprises the closure arm 91 attached to the bars 92 on which are the guiding and supporting pistons 93 and 94. These pistons operate in cylindrical bores provided in the plate 78. The outer ends of the two pistons are, of course, subject to the pressure of the water in the outer chamber 95, and the inner end of each piston may be subjected to the pressure of the water within the water chamber 80 by means of a controlling valve 96 to provide a pressure differential for moving the pistons to actuate the valve member. Within each cylinder is a passage 97 extending inwardly in a radial direction, and upon the cylindrical face of the plug portion 98 of the valve member 96 are provided longitudinally extending grooves which, upon movement of the valve member, are adapted to connect the passages 97 to either the compartment 95 or the compartment 80.

With the valve in the position shown in Fig. 6 for example, the inner end of piston 94 is in communication with the water chamber 80 through the groove 81 provided in the cylindrical plug 98. At this time the pressure on opposite sides of piston 93 is equalized as the inner side of its cylinder is in communication with the outer chamber 95 through the groove 99. The pressure of the water in the water chamber 80 is somewhat less than that in the outer chamber 95 due to the resistance of the water in passing through these chambers, so it will be apparent that with the pressure balanced on opposite side of piston 93, the piston 94 will be moved to the right, to the position shown in Fig. 6, and this will cause the entrance 87 to be closed so that the water can flow through the entrance 86. This causes the water in the chamber 80 to whirl counter-clockwise as viewed in Fig. 2, and consequently the sprinkling member will be revolved counter-clockwise as the driving device is moved in that direction by the whirl of the water.

The sprinkling member will be moved in a counter-clockwise direction until a control pin 100 projecting from the lower end of the rod 50 engages a stop surface 101 on the plug 98, and it will continue to rotate and carry this pin along with it so as to cause a partial rotation of the plug 98. The plug is connected to an arm 102 which is connected at 103 by a spring 104 to a stud 105 on the plate 78. The spring normally tends to hold the arm 102 in either of its extreme positions, one of which is shown in Fig. 2. As soon as the arm is moved by the pin 100 to the position where the point 103 is in line with pin 105 and the axis of the plug 98 the spring will snap the plug around until a stop surface 106 on the arm 102 engages a stop surface 107, and in this position the cylinder for the piston 93 will be placed in communication with the chamber 80 while the cylinder for the piston 94 is placed in communication with the outer chamber 95. When the plug is snapped over as just described and the pressure on the opposite sides of piston 93 is unbalanced the two pistons which are connected by the arms 92 will be moved so that the opening 86 is covered and the opening 87 is uncovered. The rotatable sprinkling member then moves in reverse direction until the pin 100 engages a second stop 109. When this occurs the plug will be turned, first directly by the pin 100 and later by the spring 104, so as to again move the plug 98 to the position of Fig. 6. As mentioned, this plug is provided with suitable grooves so that when it is in one extreme position one of the cylinders is connected to the chamber 80 and the other one is connected to the chamber 95, these connections being reversed when the plug is moved to its other extreme position. It will be understood that the stops 101 and 109 on the plug 98 may be arranged so that any desired angular travel of the sprinkling member may take place before a reversal in its direction of movement obtains.

The two stop surfaces 101 and 109 preferably form the sides of a pointed cam surface 112 that projects downwardly at one side of the lower end of the valve plug 98. When the sprinkling member is in its elevated operating position as shown in Fig. 1, the pin 100 is above the cam 112 and operates between the two stop surfaces 101 and 109. When the sprinkling member is in its lowered position the pin 100 is considerably below the cam and the sprinkling member at this time might be moved so that the sprinkling nozzle 44 is pointed towards an area not intended to be watered, that is, pointed in a direction not within the irrigating angle of the sprinkler. When the water is turned on under these conditions and the sprinkling member is raised by the pressure of the water supplied, the pin 100 in rising would strike the pointed cam 112 to move the sprinkling member to within the irrigating angle and would itself be directed to the proper operating position between the stops 101 and 109. The water would enter the water chamber 80 through whichever of the two openings 86 or 87 happened to be open at the time and would start the rotational movement of the sprinkling member.

Either one or the other of the openings 86 and 87 must be fully open and the other fully closed at all times due to the pressure difference existing at opposite ends of the passages connecting the chambers 95 and 80 during operation of the sprinkler, and due to the snap operation control of the valve plug 98. This pressure difference exists in a degree proportionate to the water pressure in the chamber 95 and exerted on the valve closing arm 91 to hold it tightly against the seat surface in covering one of the passage entrances. Consequently a comparatively large pressure in the chamber 95, which would tend to press the arm 91 rather tightly in place and require a large force to slide it along the seat surface, would result in a larger pressure difference and the exertion of a larger force, due to the greater difference in pressure, to actuate the pistons. A high pressure in the chamber 95 would therefore have little affect on the valve operating mechanism and it will be apparent that the sprinkler may be operated at high pressure or low pressure and yet control the valve parts effectively and in the manner intended.

The form of construction shown in Figs. 7, 8, 9 and 10 is generally similar to the one that has just been described. Referring particularly to Figs. 7 and 8 the sprinkling member 120 is shown in its retracted or inoperative position in the support or housing 121. The support or housing 121 is constructed generally similar to the form first described, that is, to provide a water chamber 122 in which the rotational whirl of the water causes operation of the driving device 123. The plate 124 which partitions the water chamber 122 from the outer chamber 125 is somewhat different in its construction and supports a reversing valve structure which embodies comparatively few simple moving parts. The plate 124 is provided with two integrally formed bosses 126 having inclined faces 127, the two bosses containing water passages 129 and 130 which are oppositely arranged so that they provide rotational whirling of the water in opposite directions in water chamber 122. The two passage entrance openings are adapted to be alternately closed by a common valve member 132 pivotally supported on a stud 133, and adapted to be operated by a valve controlling member 134. This valve controlling member 134 is mounted concentrically with respect to the sprinkling member rod 135, and is received in an opening in the plate 124, suitable retaining means such as the clamp ring 137 being provided to maintain the valve controlling member 134 in position. A control pin 140 is provided on the lower end of the rod 135 to control the position of the valve controlling member 134. This pin 140 operates between the two stop surfaces 141 and 142 on the pointed cam 143 of the member 134 and operates the member 134 from one extreme position to another. A spring 144 connects a point on the arm 134 to a nearby point on the plate 124 so that the arm will be snapped over quickly as soon as it is pushed to an intermediate position by the pin 140. The two side arms 145 of the valve control member 134 are adapted to engage the valve member 132 to shift the valve and hold one of the openings closed while the other opening is maintained opened in a manner apparent by referring to Fig. 8. The arm 146 of member 134, which preferably extends perpendicularly to the side arms 145, may be provided with a weight 146, the inertia of which under action of the expanding spring 144 will aid in overcoming the pressure of water against the valve plate of the closed passage, so as to more readily reverse the valve openings as the spring snaps the valve controlling member 134 from an intermediate position to which it has been carried by the pin 140 of the sprinkling member.

The sprinkling member and nozzle will ordinarily rotate at the rate of a few revolutions per minute while the driving device comprising the weighted impacting member may rotate many times as fast. It is to be understood that by properly proportioning the parts the rate of rotation of the sprinkling member may be varied as desired. The angular travel of the nozzle may also be made to meet various requirements. As the angular travel of the nozzle is determined by the angular spacing of the stop faces on the cam, which govern the movement of the control valve, it is obvious that the sprinkler may be caused to move any desired degree of angular travel by properly proportioning the angular spacing of the stops. Also by merely removing the control pin the sprinkling member may be caused to rotate always in one direction, the direction being dependent on the particular valve passage that is open.

It will now be obvious that a sprinkler of compact construction is provided having a simple operating mechanism which is enclosed within a housing in such a way as to obviate undesired leakage during operating conditions. The sprinkler is adapted to be oscillated through a definite range of travel without the use of gears or the use of any exposed mechanism.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A sprinkling device of the class described comprising a rotatable sprinkling member and a water chamber in communication therewith, means rotatably supporting said sprinkling member, means for supplying a flow of water rotationally to said water chamber, a freely rotatable device in said water chamber adapted upon rotational water flow to impart rotative step by step impulses to said sprinkling member, and means for automatically reversing the rotational direction of the flow of water in said water chamber after a predetermined movement of said sprinkling member.

2. A device of the class described comprising a rotatable sprinkling member and a water chamber in communication therewith, means rotatably supporting said sprinkling member, means for supplying a flow of water rotationally to said water chamber, a freely rotatable device in said water chamber adapted upon rotational water flow to impart rotative impulses to said sprinkling member, means for automatically reversing the rotational direction of the flow of water in said water chamber after a predetermined movement of said sprinkling member, said last means comprising a control member within said device operable in accordance with the movements of the sprinkling member, and valve means operated by said control member.

3. A device of the class described comprising a sprinkling member and a water chamber in communication therewith, means rotatably supporting said sprinkling member, means for supplying a flow of water rotationally to said water chamber, a freely rotatable device in said water chamber adjacent said sprinkling member rotatable relatively to said sprinkling member and adapted upon rotational water flow to impart rotative step by step impulses to said sprinkling member, means for automatically reversing the rotational direction of the flow of water in said housing after a predetermined movement of said sprinkling member, said last means comprising a control member operable in accordance with the movements of the sprinkling member, and valve means adjacent said control member enclosed by said housing and operated by said control member.

4. A sprinkler comprising a rotatable sprinkling member having a water passage therein, having a nozzle connected to said water passage for directing a stream of water at one side of said sprinkling member, a houisng portion within which said sprinkling member is normally located in retracted position, said sprinkling member being adapted to be moved during sprinkling operation by the pressure of the water to an extended operating position with the nozzle above the top of said housing portion, a water chamber to which the said passage is connected, means within said water chamber actuated by the movement of the water therein to impart controlled slow rotational movement to said sprinkling member, reversing means for reversing the direction of flow of water in said water chamber, and means operable in accordance with the movements of said sprinkling member for automatically controlling said reversing means.

5. A device of the class described comprising a housing adapted to receive water under pressure, a sprinkler member rotatably supported within said housing, a driving device adapted to be rotated by the flow of water through said housing and upon rotation to impart rotative step by step impulses to said sprinkler member, and means for reversing the direction of rotation of said driving device.

6. A device of the class described comprising a housing adapted to receive water under pressure, said housing having means for imparting rotational whirl to the water passing therethrough, a sprinkling member rotatably supported within said housing, a rotatable driving device adapted to be rotated by the flow of water through said housing and upon rotation to impart rotative step by step impulses to said sprinkler member, and means for reversing the rotational whirl of water passing through the housing after a predetermined movement of said sprinkling member.

7. A device of the class described comprising a water chamber adapted to receive water under pressure and having means for imparting rotational whirl to the water passing therethrough, a rotatable sprinkling member supported by said water chamber and adapted to be raised to an extended operating position by water pressure, a driving device in said water chamber rotated by the flow of water therethrough to impart rotative step by step impulses to said sprinkler member, and means for reversing the rotational whirl of water passing through the water chamber after a predetermined movement of said sprinkling member.

8. In a device of the class described, a support adapted to receive water under pressure, a sprinkling member mounted for free rotational movement on said support and having a sprinkling nozzle, said sprinkling member being mounted for vertical movement on said support so as to be raised to an extended position by pressure of the water supplied to said support, means for imparting step by step rotational movement to said sprinkling member in reverse directions, and means for limiting the rotational travel of the sprinkling member in extended position to a predetermined range of movement.

9. A device of the class described comprising a housing portion adapted to receive water under pressure, a rotatable sprinkling member mounted on said housing portion and adapted to be moved vertically to an extended operating position by pressure of the water, a driving device adapted to be rotated in said housing portion by flow of water through the housing portion to impart rotational movement to the sprinkling member, means positioned entirely within the housing portion for reversing the direction of the flow of water therethrough, and a control member for said reversing means attached to said sprinkling member within the housing portion, said control member being adapted to be moved to controlling position with respect to said reversing means upon movement of said sprinkling means to operating position.

10. A device of the class described comprising a housing adapted to receive water under pressure, a sprinkling member rotatably supported within said housing and adapted to be moved vertically to an extended operating position by pressure of the water, a driving device rotatable in said housing and adapted upon rotation by the flow of water through the housing to impart rotational movement to the sprinkling member, means positioned entirely within the housing for reversing the direction of the flow of water to said driving device, a control member for said reversing means attached to said sprinkling means, said control member being adapted to be moved to controlling position with respect to said reversing means upon movement of said sprinkling means to operating position, and a control engaging member on said reversing means, said engaging member being adapted to direct the movement of said control member to controlling position.

11. A device of the class described comprising a housing adapted to receive water under pressure, a sprinkling member rotatably supported within said housing, and adapted to be moved vertically to an extended operating position by pressure of the water, a driving device rotatably positioned adjacent said sprinkling member and adapted upon rotation by the flow of water to impart rotational movement to the sprinkling member, means positioned entirely within the housing for reversing the direction of the flow of water to said driving device, a control member attached to said sprinkling member, said control member being adapted to be moved to controlling position with respect to said reversing means upon movement of said sprinkling member to operating position, and a cam member on said reversing means, said cam member being adapted to direct the movement of said control member to controlling position.

12. A device of the class described comprising a supporting housing, a sprinkling member rotatably mounted on said housing, driving means in said housing adapted to be operated by a flow of water through said housing to impart rotational movement to said sprinkling member, and means for directing the flow of water through the housing in reverse directions, said reversing means comprising a plurality of water passages in said supporting housing, valve means for said passages, a valve actuating device, and means for resiliently maintaining said valve actuating device in operating position to maintain one of said passages open and another closed.

13. A device of the class described comprising a water chamber, a rotatable sprinkling member mounted on said water chamber, means in said water chamber adapted to be operated by a flow of water through said housing to impart rotational movement to said sprinkling member, and means for directing the flow of water through the housing in reverse directions, said reversing means comprising a plurality of separate water passages in said supporting housing, valve means for said passages, a valve actuating device, and means for resiliently maintaining said valve actuating device in operating position to maintain one of said passages open and another closed.

14. A device of the class described comprising a sprinkling member, a housing rotatably supporting said sprinkling member, means for supplying a flow of water rotationally to said housing, a rotatable device in said housing adjacent and rotatable relatively to said sprinkling member and adapted upon rotational flow of water through said housing to impart rotative impulses to said sprinkling member, reversing means for reversing the direction of the rotational flow of water to said rotatable device, and a control member in said housing operated by said sprinkling member for operating said reversing means.

15. A device of the class described comprising a supporting housing having a partition providing a water chamber and a fixed supporting portion, said partition having means through which the water may pass, a rotatable sprinkling member mounted on said housing and having a sprinkling nozzle, a driving device rotatable in said water chamber and adapted to be rotated by the power of the water supplied through said partition, said device upon rotation being adapted to impart rotational movement to said sprinkling member, and means for reversing the direction of flow of the water through said partition and to said device.

16. A device of the class described comprising a supporting housing adapted to receive water under pressure, a partition in said housing having means through which the water may pass, a sprinkling member rotatably mounted on said housing on one side of said partition and having a sprinkling nozzle, said sprinkling member being mounted for vertical movement on said housing so as to be raised to an extended position by pressure of the water supplied to said housing, a driving device rotatably mounted adjacent said sprinkling member and adapted to be rotated by the power of the water supplied to said housing and through said partition, said device upon rotation being adapted to impart rotational movement to said sprinkling member, and means for reversing the direction of flow of the water through said partition and to said device.

17. In a device of the class described, a support adapted to receive water under pressure and comprising a top member and a lower cup to which water is supplied, a sprinkling member rotatably mounted on said top member and having a sprinkling nozzle, said sprinkling member being mounted for vertical movement on said top member so as to be raised to an extended position by pressure of the water supplied to said support, a partition in said cup providing a water chamber and an outer chamber, a driving device rotatably mounted adjacent said sprinkling member in said water chamber and adapted to be revolved by the power of the water supplied to said chamber and to strike said member and impart rotative impulses to said sprinkling member during revolution of said device, water passage means in said partition for creating a rotational whirl of the water in said water chamber, and means operated by said sprinkling member for reversing the direction of rotational whirl of the water passing through the partition.

18. A sprinkler comprising a water chamber, a rotatable sprinkling member having a water passage therein in communication with said water chamber and having a sprinkling nozzle, means operated by the passage of water through said water chamber for rotating said sprinkling member, valve means for reversing the direction of flow through said water chamber, a differential pressure valve controller for operating said valve means with a force dependent upon the difference between the pressure in said water chamber and the pressure of the water outside of said chamber, and means operated by said sprinkling member for governing said differential pressure valve controller.

19. A sprinkler comprising a water chamber, a rotatable sprinkling member on said water chamber having a passage in communication therewith, a sprinkling nozzle on said sprinkling member for producing a flow of water laterally at one side of said sprinkling member, means operated by the passage of water through said water chamber for rotating said sprinkling member, valve means for reversing the direction of flow through said water chamber, a piston connected to said valve means, and a water supply valve automatically operable in accordance with the movements of said sprinkling member for controlling the flow of water to said piston to control the movements of said piston.

20. In a sprinkling device of the class described, in combination, a housing adapted to receive water under pressure, a rotatable sprinkler member adapted to be raised to an extended operating position by water pressure, a driving device adapted to be rotated by the flow of water through said housing and upon rotation to impart rotative step by step impulses to said sprinkler member, and means for automatically reversing the rotational direction of the driving device after a predetermined movement of said sprinkler member.

In testimony whereof we hereto affix our signatures.

WALTER H. COLES.
BERT J. NELSON.